Figure 1:
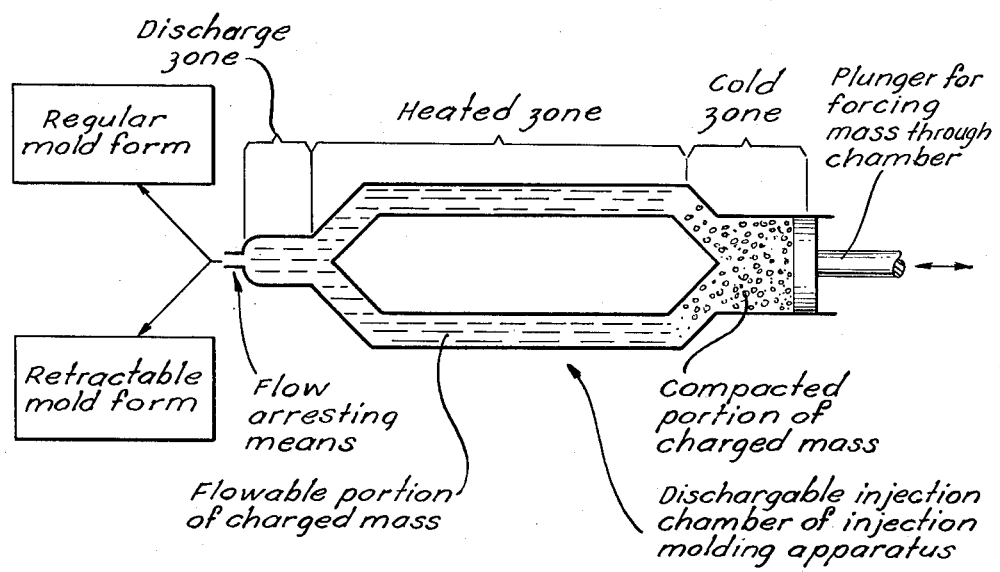

United States Patent Office 3,058,161
Patented Oct. 16, 1962

3,058,161
A METHOD OF MOLDING EXPANDABLE
THERMOPLASTIC RESINOUS BEADS
Carlton E. Beyer and Robert B. Dahl, Midland, Mich., assignors to The Dow Chemical Company, Midland, Mich., a corporation of Delaware
Filed Feb. 24, 1956, Ser. No. 567,663
1 Claim. (Cl. 18—48)

This invention relates to an improved method for molding expandable or "foamable" thermoplastic resinous materials.

Pursuant to the known art, a variety of thermoplastic polymeric and resinous materials may be expanded from a granular or bead form to assume a porous, multi-cellular, solidified foam-like structure by the action of various propellants or agents for expanding or blowing the materials. The blowing agents, in accordance with common practice, are usually gases (or gas generating substances) or highly fugacious liquids that have been dissolved or otherwise intimately incorporated within the thermoplastic resinous material while it is in an unexpanded granular form. The application of heat to an unfoamed granular themoplastic resinous material containing a blowing agent causes the blowing agent to be released or thermally expanded, or both, while the thermoplastic material is attaining a foaming temperature at which it is sufficiently softened and yieldable to permit the pressure of the thermally expanding blowing agent to expand it into the desired foam structure.

While various techniques are available for forming or shaping expandable granules and like discrete particles of expandable thermoplastic resinous materials into molded foam structures, they usually involve relatively slow, cumbersome and tedious process and operating requirements. It would be advantageous and highly desirable to provide a more expedient, efficient and facile method for such purposes. It would also be advantageous to provide improved molded articles which could be obtained readily by practice of the invention.

Among the principal objectives of the present invention, therefore, is to provide an improved method for molding expandable granules of thermoplastic resinous materials into molded foam structures. It is also among the objectives of the invention to provide a method whereby superior molded foam structures can be readily obtained from expandable granules of thermoplastic resinous material. A further object is to provide, by means of a single manufacturing operation, improved molded structures and articles having integral composite characteristics with an inner foam structure covered by a tough, solid surface layer or relatively thick skin of the thermoplastic resinous material. Other objectives and the many salutary advantages of the present invention will be more apparent in the following description and specification.

According to the invention, an improved method for molding expandable granules of thermoplastic resinous material in order to more readily and easily prepare molded foam structures comprises injection molding the expandable granules of thermoplastic resinous material. More specifically, the method comprises injecting a flowing mass of expandable granules of thermoplastic resinous material while they are at a foaming temperature into a mold form wherein the mass expands to the confining limits of the mold form to a molded foam structure.

The invention may be further characterized as comprehending a method which comprises charging a mass of expandable granules of thermoplastic resinous material containing a blowing agent incorporated in its discrete particles into the dischargeable injection chamber of an injection molding apparatus, such as a piston or plunger discharged injection cylinder or equivalent in such apparatus, said mass being adapted upon the application of adequate heat thereto to attain a foaming temperature which sufficiently softens it and causes thermal expansion of the blowing agent in the discrete particles therein to expand said mass, when it is unrestrained, to a foam structure; then, in intermittent molding cycles, forcing said mass under pressure sequently into and through a first cold zone in said chamber wherein a portion of said mass is compacted in solid, granular form while being maintained at a temperature beneath its foaming temperature; a second heated zone adjacent to the first zone in said chamber wherein a portion of said mass is heated to a flowable condition under the application of an adequate quantity of heat to cause it to attain a foaming temperature; and a discharge zone in said chamber from which a portion of said heated mass is injected into a mold form wherein the mass expands to the confining limits of the mold form to a molded foam structure; the sold, compacted portion of the mass in the first zone continuously maintaining the heated portion of said mass in the second zone under pressure to restrain substantial foaming therein throughout said intermittent cycles. The invention is schematically illustrated and depicted in FIGURE 1 of the accompanying drawing which is in the nature of an explanatory symbolic representation.

Advantageously, the amount of the expandable granules of thermoplastic resinous material that is contained in each charge thereof to the chamber represents a sufficiency to fill several mold forms during several successive molding cycles. It is desirable to arrest the effluence of the heated mass from the discharge zone of the chamber excepting during the intermittent molding cycle when it is being purposely forced therethrough. This may be accomplished by various means including valving the discharge zone to permit a discharging mold injection flow only during the intermittent molding cycles or by directing the discharging flow being injected into the mold form through a flow restraining passageway which is adapted to freeze or solidify the heated mass therein excepting during intermittent molding cycles by causing a sufficently high pressure drop in the discharging flow being injected from the discharge zone of the chamber into the mold form. The flow restraining passageway may comprise part of the chamber, part of the mold form, or a separate sealed passageway between the discharge zone of the chamber and the port or inlet gate of the mold form.

Figure 2:
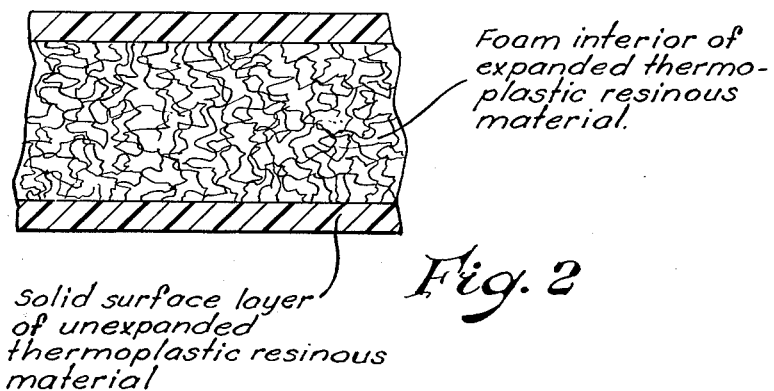

In certain instances sandwich construction molded foam structures may be desired such as is schematically illustrated in the fragmentary cross-sectional view in FIGURE 2 of the drawing. In such cases, a retractable mold form having an enlargeable confining space may be advantageously utilized for their preparation in accordance with the present invention. Such a mold form may be enlarged after injection and partial cooling of the portion of the injected expandable mass of thermoplastic resinous material in contact with the mold form to obtain a molded structure having a solid surface layer and an expanded or foam interior. Thus, the retractable mold form is injected full of the flowing mass of expandable thermoplastic resinous material at a foaming temperature which is maintained under a foam-restraining pressure while it is superficially or exteriorly being cooled from a thermoplastic condition or at least from a foaming temperature in the mold form. After a solidified or non-expandable surface layer having the characteristics of the conventionally molded unexpanded thermoplastic resinous material has formed next to the mold form in the injected mass of thermoplastic resinous material, the pressure is relieved. The mold form is simultaneously enlarged to permit the central, relatively uncooled portion of the mass remaining at a foaming temperature to expand and force the solidified surface layer against the enlarged confining limits of the mold form. Advantageously, the injection pressure may be utilized for this purpose although other arrangements may also be suitable for pressuring the injected mass in the mold form.

The method of the invention may be conducted under conditions which are similar or analogous to those required for injection molding conventional, non-expanding thermoplastic resinous materials. Thus the quantity of the charge to the dischargeable injection chamber, the heating temperature in the second zone of the chamber, the pressure required for forcing the mass through the chamber during intermittent molding cycles, the amount of heated material discharged for injection per cycle and the time required for each molding cycle depend on the characteristics of the mass of expandable granules of thermoplastic resinous material such as its flowing temperature, flow viscosity and foaming temperature as well as on the type of mold forms being utilized and the characteristics of the injection molding apparatus being employed. Beneficial operating conditions under given circumstances and conditions will be apparent to those skilled in the art.

Most conventional injection molding apparatus can be employed suitably for practice of the present invention. The apparatus should have an injection cylinder which provides a relatively short cold zone ahead of the piston or plunger so that a cushion of compacted, unmolten granules may be provided from the charge to maintain pressure on the molten or flowable material in the heated zone when the plunger is withdrawn from exerting an injecting pressure on the mass. The temperature of the cold zone generally should not exceed a thermoplastic softening temperature which usually is not in excess of about 200° F. for most expandable thermoplastic resinous materials. It is advantageous, by control of the temperature of the granules in the cold zone, especially their surface temperature, to maintain as high a coefficient of friction as possible between the compacted granules and the walls of the chamber in the cold zone. Conventional cooling means may be employed, if desired, to regulate the temperature in the cold zone. In a similar manner, conventional heating means may be utilized for heating the expandable mass in the second heated zone. It is generally advantageous to minimize the quantity of heat that is employed to that which may be required to bring the expandable mass to a flowable condition and a foaming temperature which, in many cases, are coincident.

The inventory or volume of the heated mass in the second heated zone should be kept as small as practicality will allow. Advantageously, it is not in excess of about 3 or 4 shots or portions of the heated mass which are discharged from the cylinder and injected into the mold during each intermittent molding cycle. While a cylinder having a larger heated zone inventory may be employed, it may sometimes be difficult to maintain sufficient pressure on the heated mass to satisfactorily restrain its foaming in the heated zone when greater heated volumes are involved. When this occurs it is usually necessary to purge the cylinder and refill it with a fresh mass of expandable granules of the thermoplastic resinous material.

As indicated, out-of-cycle cylinder discharge may be prevented by a suitable valve means on the cylinder or by a flow restraining passageway which freezes the material to form a discharge preventing plug excepting when an injection pressure is applied to the mass in the cylinder. The flow restraining passageway or restriction should be small enough to maintain a high pressure in the heated zone of the injection cylinder when the pressure in the cavity of the mold form is essentially at atmospheric. The size of the restriction should be adjusted to the prevailing temperature conditions to permit it, due to the pressure drop which it exerts, to freeze some of the heated mass in the passageway at the end of the injection stroke of the piston or plunger to prevent an undesired and uncontrolled flow of the treated mass from the cylinder to the mold form. Advantageously, the flow restraining passageway is provided in the mold form and comprises its inlet port. This permits greater flexibility to be attained with a given injection molding apparatus for purposes of molding expandable masses of thermoplastic resinous materials.

Better results may usually be achieved when the mold form is free from long flow paths and sharp corners. The design of the mold form should be such that substantial pressure drops are avoided across the mold cavity, taking into account the relationship of the flow viscosity and molding temperature of given expandable masses of thermoplastic resinous materials to the desired thickness and configuration of the mold form.

When sandwich construction molded foam structures are prepared, the retractable mold form having an enlargeable mold cavity may be designed to have separable or movable walls, collapsible cores, retractable sides or other cavity enlarging means as may be necessary and adapted for the purpose. Advantageously the wall temperatures of retractable mold forms are maintained low enough to quickly cool a substantial layer of the injected mass against the mold surface before enlarging the mold cavity. In some cases it may be desirable for such purposes to positively cool the mold form by any suitable means.

In practice, the sandwich construction molded foam structures using retractable molds may be obtained with the conventional injection molding apparatus suitable for purposes of the invention by injecting the retractable mold form full of the heated mass of expandable thermoplastic resinous material and permitting the pressure piston to dwell momentarily at a position of maximum thrust in the cylinder. This dwell serves to maintain the injection pressure on the mass in the mold form while the surface layer is formed by cooling. The piston may then be drawn back and the mold form enlarged to permit simultaneous formation of the sandwich construction molded foam structure.

The thickness of the simultaneously formed surface layer obtained in sandwich construction molded foam structures and the cross-sectional characteristics may be predetermined and varied to suit particular requirements. The layer thickness which is obtained depends primarily upon the length of time which the injected mass is permitted to superficially cool in the filled retractable mold form before it is enlarged. Integral composite structures having a surface layer with a solid thickness of at least $\frac{1}{32}$ inch can be obtained readily by practice of the invention. In such layers the thermoplastic resinous material has the essential rigid and strong characteristics of ordinary unexpanded molded material. The density of the finally obtained molded structure and particularly of its foamed inner section depends primarily upon the amount of retraction and enlargement which is effected in the mold form. Care should be taken to permit the superficially cooled layer or skin to obtain sufficient thickness and solidification before enlarging the mold form in order to preclude the formation or break through of gas bubbles and the like in and from the expanded central portion. For similar reasons the injected mass should not be heated to too high a temperature when sandwich construction moldings are being made to avoid excessive foaming and gas pressure in the expanded central portion of the molding.

Any thermoplastic resinous material which can be expanded or foamed by conventional techniques may advantageously be formed into molded foam structures in accordance with the method of the present invention. For a wide variety of applications, however, without intending to be restricted thereto, the invention is particularly adapted to be practiced with granules or beads and other discrete particles of polystyrene, which may be in an essentially linear or in a cross-linked form, as being generally representative of expandable thermoplastic resinous materials and as being especially representative of alkenyl aromatic compounds which contain at least one alkenyl aromatic compound having the general formula Ar—CR=$CH_2$ wherein Ar is an aromatic compound and R is selected from the group consisting of a hydrogen atom and a methyl radical. Expandable thermoplastic copolymers of styrene and polymers and copolymers of $\alpha$-methyl styrene, ar-methyl styrene or vinyltoluene, mono- and di-chlorostyrene, including copolymers containing small amounts of such materials as divinylbenzene may frequently be utilized with benefits commensurate with those which are derivable from employment of polystyrene. Often this may also be the case with other expandable thermoplastic resinous materials including various copolymers of vinylidene chloride which are frequently generically described as being sarans and thermoplastic resinous materials which may be comprised of polymers and copolymers of methyl methacrylate, ethyl acrylate and other derivatives of acrylic acid such as their homopolymers and copolymers of methyl methacrylate and vinylidene chloride; polymers and copolymers of vinyl acetate and vinyl butyral and the like; and various thermoplastic or thermoplastified derivatives of cellulose including cellulose nitrate and cellulose acetate. Cross-linked materials usually have greater thermal stability and frequently tend to produce stronger, less heat-sensitive foam structures.

The blowing agents employed for the expandable thermoplastic resinous material may be those which are commonly utilized including dichlorodifluoromethane, carbon dioxide, pentane and other low boiling hydrocarbons or other suitable materials such as heat sensitive gas generating agents and the like. Conventional amounts of the blowing agent may be incorporated in the discrete particles of thermoplastic resinous material to render it suitably expandable for purposes of practicing the invention. Thus, an incorporated amount of dichlorodifluoromethane between about 5 and 15 percent by weight may be found to be a satisfactory and efficient amount in many expandable thermoplastic resinous materials, particularly polystyrene and many other alkenyl aromatic thermoplastic resinous materials.

By the way of further illustration a series of injection moldings in various flat shapes were prepared with expandable polystyrene and cross-linked polystyrene granules. The cross-linked granules contained about 0.06 percent by weight of divinylbenzene. The average particle sizes of the granules were between about 1 and 1.5 millimeters in their greatest dimension. Each type of granule was employed containing both dichlorodifluoromethane and carbon dioxide as incorporated blowing agents in amounts which varied between about 5 and 15 percent by weight. The ordinary polystyrene granules were molded with a temperature in the heated zone of the injection cylinder of about 325 to 375° F. The temperature of the heated zone for the cross-linked granules was about 350 to 425° F. Using injection cycles of about 1 to 2 minutes, molded foam structures having densities up to about 6.3 pounds per cubic foot were obtained.

Sandwich construction moldings having tough, solid surface skin layers with a thickness up to about 1/16 inch were obtained in a similar manner by varying the dwell period of the piston at the end of each injection stroke for periods of from about 1 to 5 seconds. Better results were obtained with the sandwich construction moldings when the higher viscosity cross-linked granules were used for their preparation.

As is apparent, the method of the present invention facilitates the rapid and efficient preparation of molded foam structures using commonly available injection molding apparatus. In addition, it permits all-plastic sandwich construction foam moldings to be obtained conveniently in a single operation whereas, according to conventional techniques, at least two processing steps are required to first form the foam structure and then laminate the desired plastic layer or layers to its surface.

Certain changes and modifications in the practice of the present invention can be readily entered into without substantially departing from its intended spirit and scope. Therefore, it is to be fully understood that the invention is not to be considered as being limited or in any way restricted to or by the foregoing description and specification. Rather, it is to be interpreted and construed in the light of what is set forth and defined in the hereto appended claim.

What is claimed is:

Method for molding expandable granules of thermoplastic resinous material into sandwich construction molded foam structures which comprises charging a mass of said granules into the dischargeable injection chamber of an injection molding apparatus; then, in intermittent molding cycles, forcing said mass under pressure sequentially in and through a first cold zone in said chamber wherein a portion of said mass is compacted in solid granular form while being maintained at a temperature beneath its foaming temperature; a second heated zone adjacent to the first zone in said chamber wherein a portion of said mass is heated to a flowable condition under the application of an adequate quantity of heat to cause it to attain a foaming temperature; the solid compacted portion of the mass in the first zone continuously maintaining the heated portion of said mass in the second zone to restrain substantial foaming therein throughout said intermittent cycles; and a discharge zone in said chamber from which a portion of said heated mass is injected to fill a retractable mold form having an enlargeable cavity wherein the injected mass is initially exteriorly cooled against the mold form to form a solidified surface layer while being maintained under pressure; and finally relieving the pressure and enlarging the mold form to permit the central, relatively uncooled heated mass to expand and force the solidified surface layer against the enlarged confining limits of the mold form to form said sandwich construction molded foam structure.

References Cited in the file of this patent

UNITED STATES PATENTS

| | | |
|---|---|---|
| Re. 22,899 | Tucker | July 15, 1947 |
| 2,214,182 | Schelhammer | Sept. 10, 1940 |
| 2,341,360 | Bulgin | Feb. 8, 1944 |
| 2,502,304 | Baker | Mar. 28, 1950 |
| 2,514,390 | Hagen | July 11, 1950 |
| 2,535,436 | Maynard | Dec. 26, 1950 |
| 2,706,311 | Durst | Apr. 19, 1955 |
| 2,722,719 | Altstadter | Nov. 8, 1955 |
| 2,744,291 | Stastny et al. | May 8, 1956 |
| 2,753,642 | Sullivan | July 10, 1956 |
| 2,797,443 | Carlson | July 2, 1957 |

FOREIGN PATENTS

| | | |
|---|---|---|
| 839,092 | Germany | Apr. 10, 1952 |

OTHER REFERENCES

"Plastic World," Foaming-Agent-Impregnated Polystyrene Beads Expand in Heated Molds to Controllable Sizes and Densitites, March 1954, page 4.

Simonds et al.: "Handbook of Plastics," 2nd ed., January 1949, D. Van Nostrand Co. Inc., N.Y., page 1423.